United States Patent
Main et al.

[11] Patent Number: 5,769,185
[45] Date of Patent: Jun. 23, 1998

[54] CARBON BRAKE DISC STRUCTURES AND METHOD OF MAKING SAME

[75] Inventors: Ralph R. Main, Canal Fulton; Jeremiah W. Mills, Akron; Julian Norley, Chagrin Falls; Edward M. Tatarzycki, Stow; William D. Thompson, Canton; John G. Evrard, Canal Fulton, all of Ohio

[73] Assignee: Aircraft Braking Systems Corporation, Akron, Ohio

[21] Appl. No.: 801,554

[22] Filed: Feb. 18, 1997

Related U.S. Application Data

[63] Continuation of Ser. No. 450,443, May 25, 1995, abandoned.

[51] Int. Cl.[6] ....................................................... B60T 1/06
[52] U.S. Cl. ................................ 188/18 A; 188/218 XL
[58] Field of Search .............................. 188/18 R, 18 A, 188/218 XL, 234, 251 M, 250 G, 71.5; 192/70.13, 70.14, 107 R, 107 M

[56] References Cited

U.S. PATENT DOCUMENTS

| | | | |
|---|---|---|---|
| 1,789,133 | 1/1931 | Bluhm | 188/250 G |
| 1,935,348 | 11/1933 | Blume | 188/250 G |
| 3,724,614 | 4/1973 | Bender | 188/218 XL |
| 3,800,392 | 4/1974 | Cook et al. | 188/218 XL X |
| 3,834,320 | 9/1974 | Tack | 188/250 G X |
| 4,132,294 | 1/1979 | Poli | 188/218 XL |
| 4,858,732 | 8/1989 | Taylor, Jr. | 188/250 G |
| 4,982,818 | 1/1991 | Pigford | 188/218 XL X |
| 5,099,960 | 3/1992 | Alev | 188/248 XL X |
| 5,407,032 | 4/1995 | Gaudefroy et al. | 188/218 XL X |

*Primary Examiner*—Lee W. Young
*Attorney, Agent, or Firm*—Renner, Kenner, Greive, Bobak, Taylor & Weber

[57] ABSTRACT

Brake disc assemblies and methods for making the same which allow for increased carbon utilization. In one embodiment of the invention, worn or spent discs from a carbon brake disc assembly are used to fabricate new brake discs. The separate discs, individually unsuited for further use in a brake assembly, are secured together with like wear material and subjected to chemical vapor infiltration to configure a disc suitable for use as a new disc. In other embodiments, previously used discs or new carbon material is employed to configure wear pads or wear discs which are affixed to opposite sides of a carrier plate and then subsequently used in a brake disc assembly. In all of the embodiments, carbon screws or threaded rods are employed to hold the components of the disc together. Such carbon screws or threaded rods are fabricated from otherwise worn or spent carbon discs or from new carbon.

9 Claims, 3 Drawing Sheets

CARBON BRAKE DISC STRUCTURES AND METHOD OF MAKING SAME

This is a continuation of application Ser. No. 08/450,443, filed May 25, 1995, now abandoned.

TECHNICAL FIELD

The invention herein resides in the art of vehicle brakes and, more particularly, to carbon brake disc assemblies of the type often used on aircraft. Specifically, the invention relates to the structure and method of manufacture of the discs comprising such assemblies. The invention further pertains to a method of refurbishing carbon brake discs and the resultant structures thereof and particularly wherein otherwise fully worn discs are employed in 2-for-1 and 3-for-1 refurbishment schemes or in which such worn discs are employed for the development of wear pads for a disc assembly. The concept of the invention also relates to the structure and technique of manufacturing brake discs of new carbon.

BACKGROUND ART

Carbon brakes are now commonly used in aircraft applications. Such brakes are lightweight and exhibit attractive thermal properties, being able to withstand and dissipate the high thermal energy levels encountered in aircraft braking. The carbon brakes employed in aircraft typically comprise a plurality of alternatingly interleaved rotor and stator discs of suitable carbon material. As braking activities take place, the discs wear and, accordingly, require periodic overhaul, replacement, and/or refurbishment. Although the lightweight characteristics and thermal properties of carbon brake discs make them attractive for use in aircraft braking systems, such carbon discs are rather expensive, particularly when compared to steel brakes or the like. While there have been successful efforts to lower the costs of carbon disc brakes and thus reduce the associated "costs per landing", carbon is still considered an expensive braking medium.

Because of the costs associated with carbon brake discs, it has become common practice to reuse discs otherwise worn to an unacceptable thickness by machining the faces of the otherwise worn discs and joining them together by clips or the like. In other words, when a disc has worn to a thickness making it unsuited for further use in an operative brake, further use of the expensive carbon material has been attained by joining that worn disc with a similarly worn disc in what has become known as a 2-for-1 refurbishment configuration. According to this technique, two worn or spent discs are machined to one half the thickness of a new disc, bound together mechanically by clips attached to the discs outside of the wear area. In the case of stators, the clips are attached at the inner periphery of the discs, while the clips are attached about the outer periphery of rotors.

Known refurbishment techniques allow for use of carbon discs beyond their normal life cycle and thereby provide for improved carbon utilization. However, the refurbishment techniques of the prior art have had a number of inherent drawbacks. Typically, these techniques have been adapted only for use in 2-for-1 refurbishment but do not allow for reuse of discs worn to less than one half of the "new" thickness. Additionally, the bond between the discs is achieved by metallic clips and, accordingly, is of a mechanical nature. As a consequence, the integrity of a refurbished disc made in accordance with the 2-for-1 technique of the prior art is greatest at the perimeters where the clip bonds are effected and of lesser integrity at the wear surfaces.

Accordingly, there is a need in the art for refurbished carbon discs and a method of making the same that allows for further improved carbon utization and improved integrity of the refurbished discs.

Carbon utilization may also be improved by providing means for using otherwise "spent" carbon discs as by employing the discs as a wear surface on a carrier plate or the like. For example, discs which have been worn down after a 2-for-1 refurbishment still have useful carbon that may be employed for braking action. Such carbon may best be used by applying it to a carrier disc, allowing the carbon to serve as the braking medium.

Economy may also be enhanced by the provision of brake discs employing carbon wear pads, since the reduced thickness of the wear pads will significantly reduce cost. Molding, carbonization, pyrolysis and CVD times are also directly related to part thickness. Accordingly, the use of wear pads offers the potential for reducing processing time.

Accordingly, there is a need in the art for a brake disc structure providing a carrier for carbon wear pads, which wear pads are from otherwise spent carbon discs. There is a similar need for such disc structures employing wear pads made of new carbon.

DISCLOSURE OF INVENTION

In light of the foregoing, it is a first aspect of the invention to provide a carbon brake disc and a method for making the same which is capable of improved carbon utilization over the prior art.

Another aspect of the invention is the provision of a carbon brake disc and method of making the same which is capable of obtaining a single disc from three used discs, which used discs are too thin for use in a standard 2-for-1 refurbishment.

Yet a further aspect of the invention is the provision of a carbon brake disc and method of making the same which does not require metal clips to hold the components thereof together.

Still a further aspect of the invention is the provision of a carbon brake disc and method of making the same which achieves a substantially homogenous brake disc.

Yet a further aspect of the invention is to provide a carbon brake disc and a method of making the same which employs carbon screws or threaded carbon rods made of brake disc material to bond together the component elements of the brake disc.

Still a further aspect of the invention is the provision of a carbon brake disc and a method of making the same which is easy to implement with state of the art apparatus and techniques.

Another aspect of the invention is the provision of a carbon brake disc and method of making the same wherein a spent disc is used as a wear surface on a carrier disc.

Another aspect of the invention is the provision of a carbon brake disc and a method for making the same in which a spent disc is mounted as a disc on a carrier.

Yet another aspect of the invention is the provision of a carbon brake disc and a method of making the same in which a spent disc is mounted as a disc segment on a carrier disc.

A further aspect of the invention is the provision of a carbon brake disc and method of making the same in which carbon wear pads are carried by a core disc.

Still another aspect of the invention is the provision of a carbon brake disc and method of making the same in which a core carrying carbon wear pads may be of similar or dissimilar material with respect to the wear pads.

The foregoing and other aspects of the invention which will become apparent as the detailed description proceeds are achieved by a brake disc, comprising: a carrier plate; carbon wear plates maintained on opposite sides of said carrier plate; and carbon screws passing through said carbon wear plates and into said carrier plate and securing said carbon wear plates thereto to form a brake disc assembly.

Other aspects of the invention are attained by a method for fabricating a brake disc, comprising: securing at least a pair of carbon wear plates to each other; and chemical vapor infiltrating said carbon wear plates into an integral homogeneous unit.

Yet further aspects of the invention which will become apparent herein are attained by a brake disc unit, comprising: a carrier plate; and carbon wear plates maintained on opposite sides of said carrier plate and secured thereto by elongated threaded carbon members.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
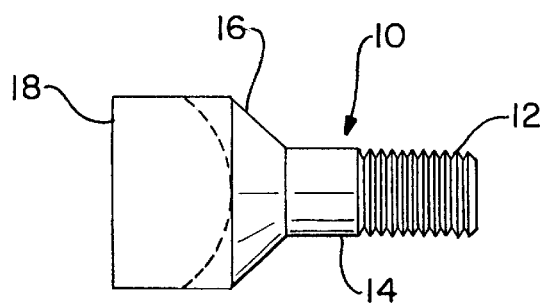
FIG. 1 is a side elevation view of a carbon screw according to the invention.

Referring now to the drawings and more particularly FIG. 1, it can be seen that a carbon screw made in accordance with the invention is designated generally by the numeral 10. The screw 10 is preferably made of the same carbon material as carbon discs employed in aircraft brake disc stacks. Indeed, it is desired that the carbon screws 10 be manufactured from fully worn and/or "scrap" carbon discs, further adding to desirable increased carbon utilization. They may, of course, also be made of new carbon material. As shown, the carbon screw 10 includes a threaded shank 12, a neck 14, and a conically shaped shoulder portion 16. A head 18 is configured at an end of the screw 10 opposite the threaded shank 12 and is preferably configured to be adapted for engagement with a tool such as a wrench or the like facilitating placement as will be discussed herein. To that end, the head 18 may be of a square, hexagonal or any suitable geometric configuration.

Figure 2:
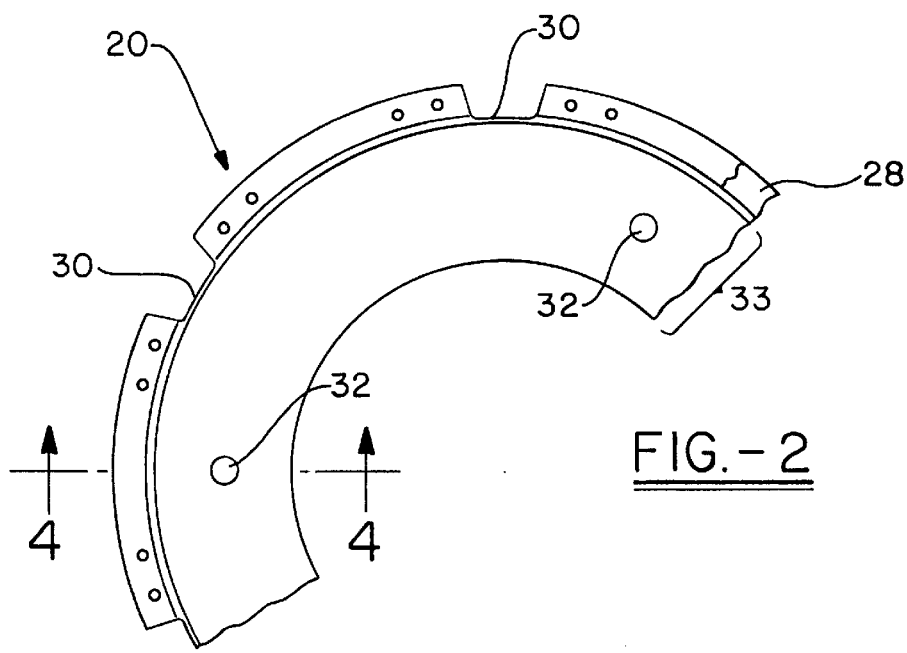
FIG. 2 is a partial sectional view of a rotor made according to the invention.
Figure 3:
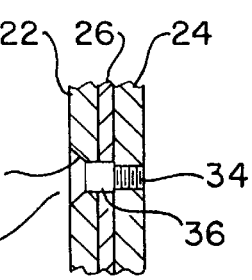
FIG. 3 is a partial sectional view of a rotor according to the invention showing a bore therein for receiving the carbon screw of FIG. 1.
Figure 4:
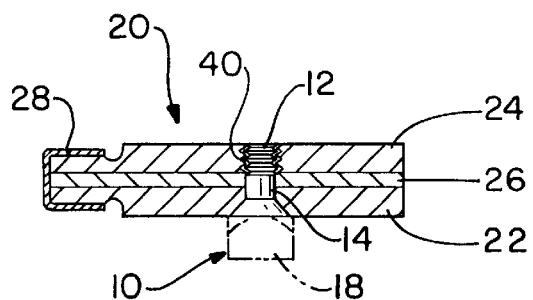
FIG. 4 is a cross sectional view of the rotor of FIG. 2 taken along the line 4—4.

Referring now to FIGS. 2–4, it can be seen that a brake disc made in accordance with the teachings of a first embodiment of the invention is designated by the numeral 20. While the brake disc 20 is illustrated in the configuration of a rotor, it will be appreciated that the concept of the invention is equally applicable to stator discs as well. As illustrated in FIGS. 3 and 4, the brake disc 20 comprises a pair of outer discs 22, 24 which are typically thicker than an inner disc 26. Each of the discs 22–26 would typically be too thin to be used in a 2-for-1 refurbishment scheme and, accordingly apart from utilization in accordance with the concept of the present invention, would have been treated as scrap. The discs 22–26 will typically be taken from fully worn brake disc stacks at an overhaul time when such discs are too thin for independent further use in a brake disc stack. Prior to use in the assembly of the brake disc 20, the discs 22–26 are preferably machined down to remove rough surfaces, warpage, or the like and are established at predetermined thicknesses. While the invention herein is presently described with respect to the implementation of three previously worn discs, it will be understood by those skilled in the art that the concept of the invention is equally applicable to embodiments employing two such discs and, indeed, may be applied to the fabrication of a brake disc from any suitable plurality of such discs having a combined thickness equal to that of a "new" disc.

As shown in FIGS. 2 and 4, the outer edges 28 of the discs 22, 24, are chamfered to receive drive clips by means of rivets or the like. While the drive clips would be received on the outer circumferential edge of the rotor disc 20, it will be appreciated that in the context of a stator disc, such clips would be received on chamfered areas provided about the inner periphery thereof. In any event, a plurality of drive slots 30 are provided in the chamfered areas 28 to receive the drive clips for purposes of allowing keyed engagement with an appropriate wheel or torque tube.

With the discs 22–26 machined and aligned, and with the drive clips in place, axial bores 32 are placed therein as shown. While any suitable number of bores 32 may be employed, it is presently contemplated that at least three such bores be used. In such a configuration, the bores 32 will be uniformly circumferentially spaced within a wear surface area 33 of the disc 20. When three such bores 32 are employed, the spacing therebetween would, of course, be on the order of 120°, as shown.

With the bores 32 so placed, each bore 32 within the outer disc 24 may be tapped as at 34 to receive the threaded shank 12 of a carbon screw 20. In like manner, a shoulder bore 36 may be configured in the inner disc 26 and the other outer disc 22. Finally, a counterbore region 38 may be provided in the outer disc 22, all of which is best shown in FIG. 3. The bore portions 34-38 are preferably configured to matingly receive the carbon screws 10 as best illustrated in FIG. 4. Indeed, each of the bores 32, configured as just described, receives a carbon screw 10 which is applied thereto by means of a wrench or other appropriate tool engaging the head 18. The carbon screws 10 pull the component disc plates 22–26 together and retain them in that manner for further processing as will be discussed below. When first engaged, the head 18 of the screw 10 protrudes beyond the outer wear surface of the disc 22, while the threaded shank portion 12 extends outwardly from the wear surface of the disc 24.

In the fabrication of a brake disc 20, whether it be a stator or a rotor, the component discs 22–26 are machined to an appropriate thickness and flatness, with the thinnest disc preferably comprising the core disc 26. Bores 32 are made through the three discs uniformly spaced circumferentially about the assembly and equally radially spaced from the center thereof. However, the number and spacing of such bores may vary to appropriately satisfy structural needs. As previously discussed, the bores 32 will typically be present within the wear area of the disc 20. Carbon screws 10 are inserted into the bores 32 and tightened to draw the disc components 22–26 together. The head 18 and threaded shank 12 are then ground flush to their respective surfaces 22, 24. The entire assembly is then placed into a chemical vapor infiltration oven and processed in standard fashion. During carbon infiltration void areas 40 between the screws 10 and their receiving bore 32 will typically be filled with carbon, resulting in a substantially homogeneous structure. As a consequence, carbon utilization is greatly enhanced, for discs which would otherwise have been scrapped as being of insufficient thickness for further use in a brake disc assembly are, in fact, joined with other similar discs to configure a carbon brake disc suitable for braking activity.

Figure 5:
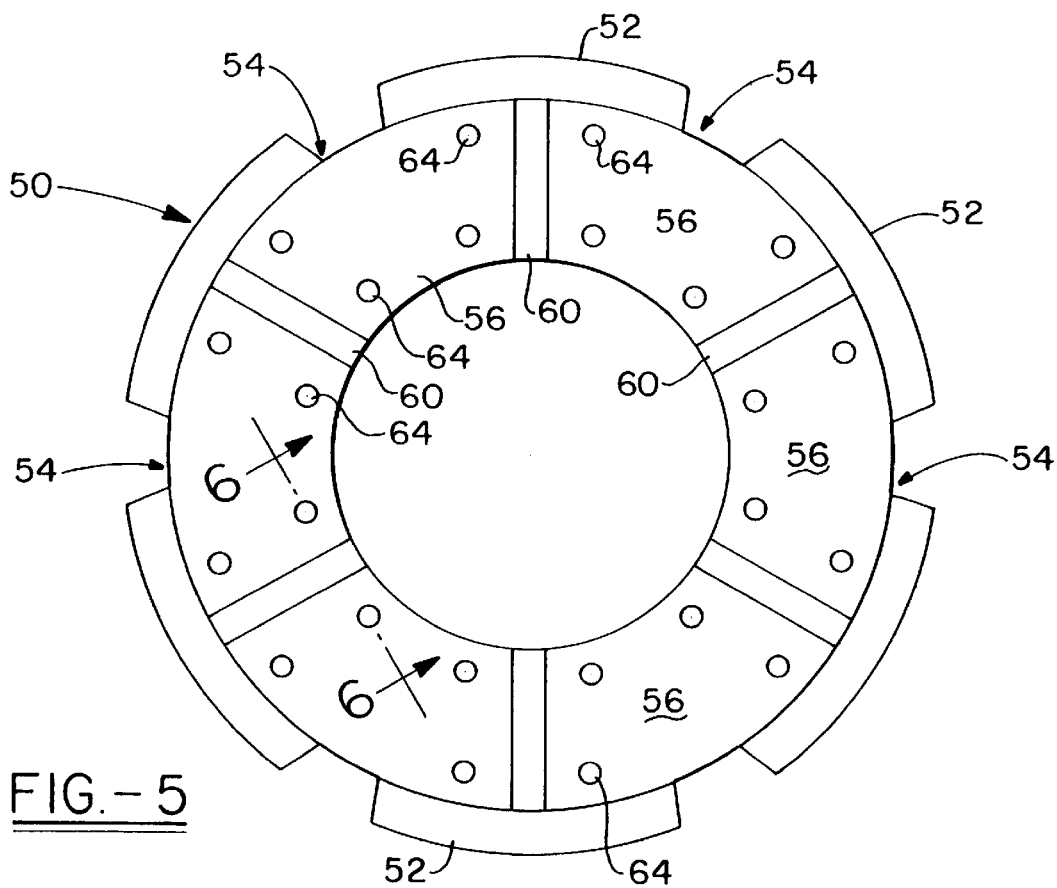
FIG. 5 is a front elevational view of a rotor according to a second embodiment of the invention.
Figures 6, 7:
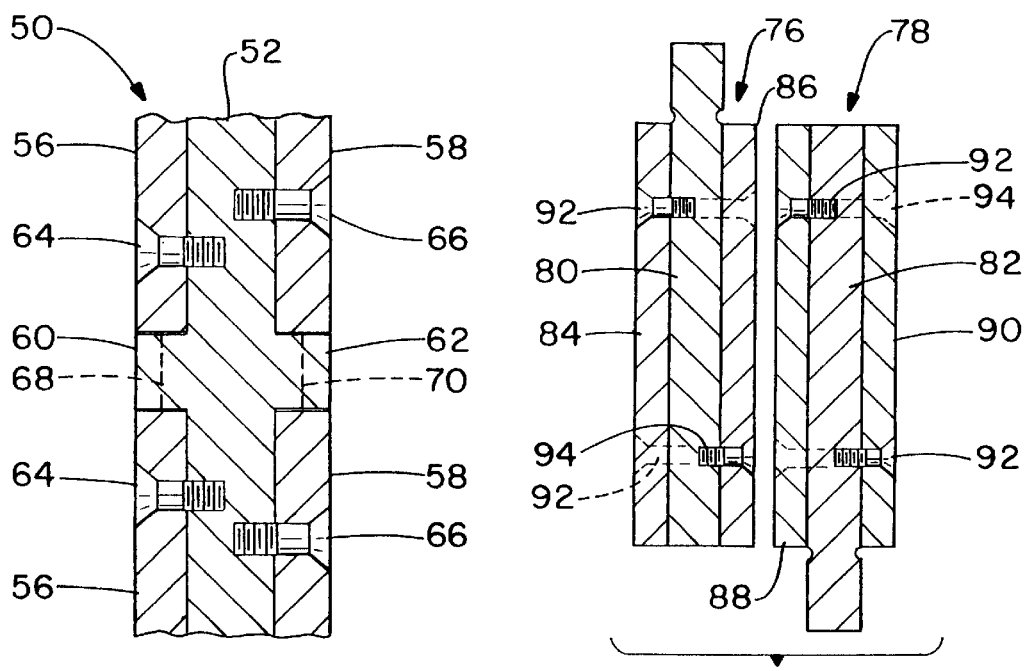
FIG. 6 is a sectional view of the rotor of FIG. 5 taken along the line 6—6.
FIG. 7 is a cross sectional view of a stator and rotor according to the second embodiment of the invention, wherein wear faces are full annular discs maintained upon a carrier plate.

Referring now to FIGS. 5 and 6, an appreciation can be obtained of a brake disc 50 made in accordance with a second embodiment of the invention to further achieve optimum carbon utilization. Again, while the brake disc 50 is shown in the embodiment of a rotor, it will be understood that the concept of the invention is equally applicable to the development of stators.

As shown in FIGS. 5 and 6, a carrier plate 52 is provided as a core or central plate for the brake disc 50 and may be fabricated of any appropriate material such as steel, carbon, beryllium, or the like. A plurality of slots 54 are formed in the outer circumferential edge of the carrier plate 52 in rotors, and at inner/circumferential surfaces of stators, as previously described. Additionally, the slots 54 may include drive clips such as previously mentioned to assist in engagement with a torque tube, axle splines, wheel drives, or the like.

A plurality of arcuate segmented carbon wear pads 56, 58 are positioned on either side of the carrier plate 52. The segmented wear pads 56, 58 are preferably formed from "used", "worn", or "spent" discs from carbon brakes which have been removed at an appropriate overhaul although "new" carbon may be used as well.

A plurality of radially extending ribs 60, 62 are provided on each side of the carrier plate 52 and define receiving areas for the segmented wear pads 56, 58. In the preferred embodiment of the invention, the ribs 60, 62 are provided to take the shear loads placed upon the wear pads 56, 58 during braking activities. A plurality of carbon screws 64, 66, again fabricated from "worn", "spent", or "new" carbon are countersunk in respective wear pads 56, 58 and threadedly engage the carrier plate 52, as best shown in FIG. 6. The carbon screws 64, 66 pull the wear ads 56, 58 tightly toward and against the carrier plate 52. In the preferred embodiment of the invention, four such carbon screws 64, 66 are provided in association of each of the segmented wear pads 56, 58, as shown. Of course, any appropriate number of screws may be used.

The height of the ribs 60, 62 will typically be dependent upon the material of the wear pad and its strength. In the event that the ribs 60, 62 comprise a wear material similar to that of the wear pads 56, 58, the ribs 60, 62 may be of a height equal to the thickness of the wear pads. Accordingly, during braking operations both the wear pads and the ribs will wear together. Such a configuration would be contemplated in the event that the carrier plate 52 is fabricated of carbon. However, in the event that the ribs 60, 62 are of a material dissimilar to that of the wear pads 56, 58, a clearance will typically be provided between the wear surfaces of the pads 56, 58 and the exposed surfaces of the ribs 60, 62. As is best shown in FIG. 6, the ribs 60, 62 may be of a height illustrated by the dashed lines 68, 70 when such a dissimilar material is used. Accordingly, the height of the ribs 60, 62 will then be such as to extend to a level just below the "worn" level of the associated wear pads 56, 58 at the time that removal and replacement is necessary. Accordingly, there will be no engagement between the ribs 60, 62 and the opposite wear surface during braking operations. Those skilled in the art will appreciate that the ribs 60, 62 may be machined from the carrier plate 52, or be otherwise affixed thereto.

Those skilled in the art will readily appreciate that the brake disc 50 may readily be fabricated by configuring wear pads 56, 58 from worn or otherwise used carbon brake discs. Of course, such discs will typically be machined for flatness and desired thickness. Appropriate holes are placed in the wear pads 56, 58 and threaded into the carrier plate 52 to receive the carbon screws 64, 66. If desired, a chemical vapor infiltration process may also be employed as presented earlier herein. However, it is contemplated that the wears pads 56, 58 are independently formed and finished before application to the carrier plate 52 and there is no post assembly CVD.

With reference now to FIG. 7, it can be seen that carbon discs such as a rotor 76 or stator 78 may be fabricated in the method just described with respect to FIGS. 5 and 6, but wherein the wear surfaces comprise complete annular rings, rather than segments. In the embodiment of FIG. 7, core discs 80, 82 are again provided. As with the prior embodiment, the core discs 80, 82 may be of any suitable material such as carbon, steel, beryllium, or the like. Annular carbon discs 84, 86 are applied to opposite sides of the core disc 80 of the rotor 76, while annular discs 88, 90 are applied to the core disc 82 of the stator 78. Again, the annular discs 84–90 comprise wear discs and are preferably fabricated from "worn" or otherwise "spent" discs removed from an aircraft brake assembly at an overhaul time. Again, the annular discs 84–90 are preferably machined for flatness and desired thickness as previously described. It is, of course, also contemplated that the annular discs 84–90 may be fabricated from "new" carbon, as well.

As also previously presented, a plurality of carbon screws 92, 94 may be employed to securedly engage the annular discs 84, 86 to the associated core 80, and the annular discs 88, 90 to the associated core 82. The carbon screws 92, 94 achieve a tight secure engagement of the annular wear discs to the associated carrier plates. In this embodiment, however, no ribs are provided and the shear load introduced by the braking activity is carried by the carbon screws 92, 94.

Figure 8:
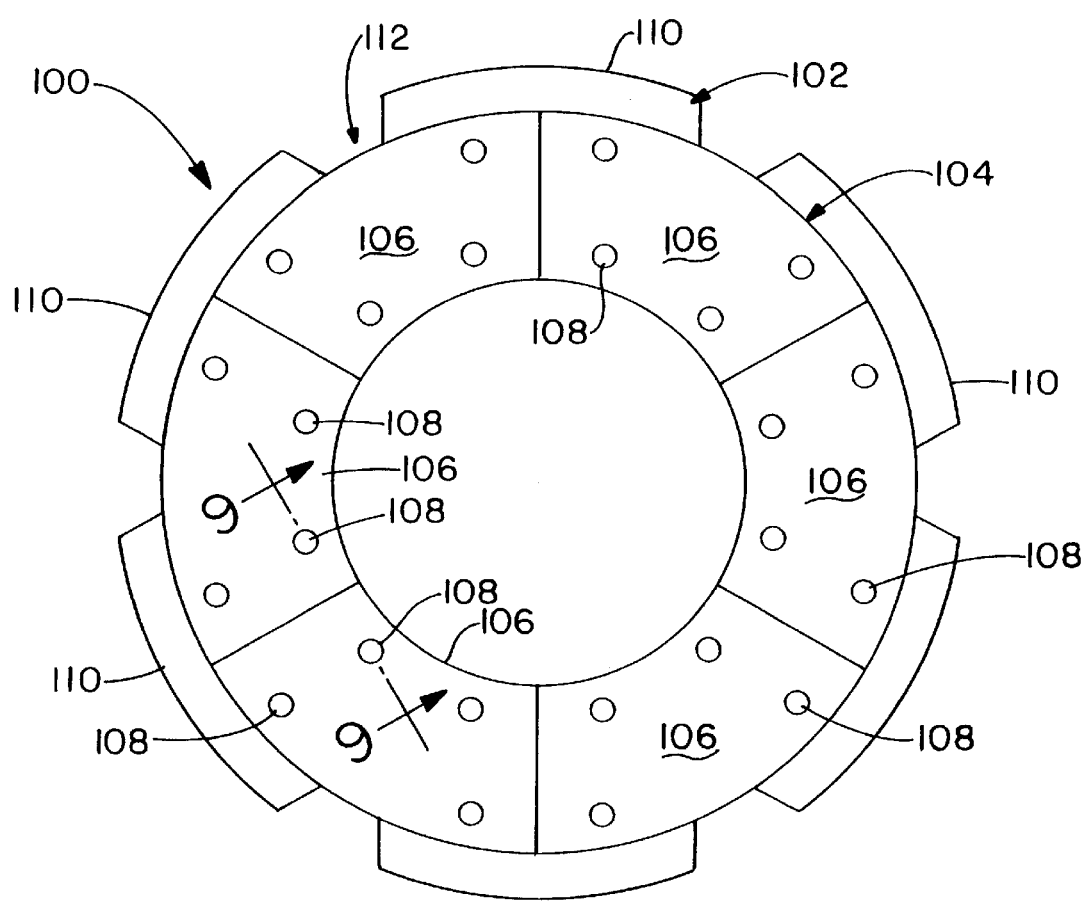
FIG. 8 is a front elevational view of a rotor according to a third embodiment of the invention.
Figure 9:
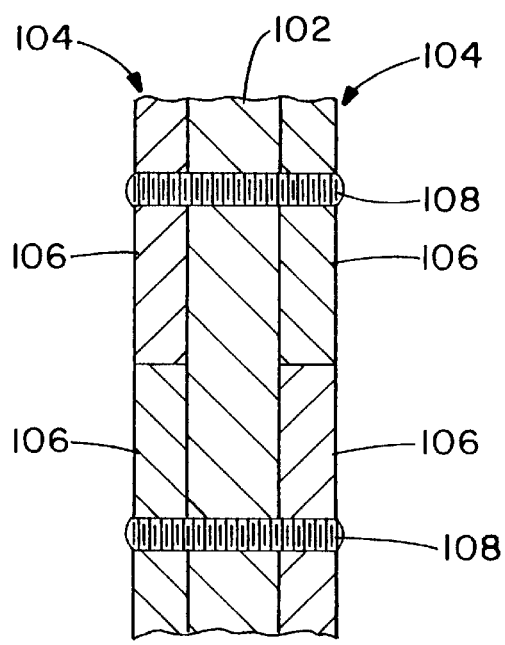
FIG. 9 is a cross sectional view of the rotor of FIG. 8 taken along the line 9—9.

With reference now to FIGS. 8 and 9, an appreciation of a third embodiment of the invention may be attained. As shown, a rotor disc according to this embodiment is designated generally by the numeral 100. Again, it will be appreciated that while a rotor disc is shown for illustrative purposes, the concept of the invention applies to stator discs as well. Here a central core disc 102 is provided as a carrier and is preferably fabricated of carbon, steel, beryllium, or other suitable material. Affixed to each side of the carrier 102 are carbon wear materials configured in the form of annular discs as designated generally by the numeral 104. In the preferred embodiment of the invention, the wear material comprises an appropriate carbon composite. Further, it is contemplated that the wear material portions 104 be comprised of a plurality of abutting segments 106. As illustrated, each of the segments 106 has inner and outer arcuate edges with linear side edges such that the segments can abut each other to form a contiguous annular disc. In one embodiment of the invention, the segments 106 are preformed, carbonized, and finished before there application to the carrier disc 102. However, it is also contemplated that the carbonizing and finishing of the segments 106 may take place in association with the carbonation of the disc 100 as a whole.

According to the invention, each of the segments 106 is interconnected with the carrier disc 102 and a corresponding segment 106 on an opposite side of the carrier by means of threaded carbon rods 108 passing completely through the assembly 100. As best demonstrated in FIG. 9, the threaded carbon rods 108 extend beyond the planar surfaces of the segments 106 comprising the wear portions 104. In finishing the disc 100, the threaded carbon rods 108 are ground flush to such planar surfaces.

An external rim 110 having a plurality of uniformly circumferentially spaced slots 112 therein extends beyond the outer circumferential edge of the annular rings formed by the abutting segments 106. The rim 110 and slots 112 are adapted to receive drive clips for engaging appropriate drive keys of a wheel.

It will be appreciated that when the carrier 102 and segments 106 all comprise carbon, the CVD, carbonization, and pyrolization process may be undertaken with the disc 100 preassembled. Alternatively, and particularly where the carrier 102 does not comprise carbon, or where processing time is to be reduced, each of the elements 102, 106 will be individually carbonized and completed before assembly.

It will be appreciated that the external rim 110 is an extension of the carrier disc 102 alone, being of the same thickness as the carrier disc. In such case, the material of the carrier disc 102 will be chosen for its strength, while the material for the wear pad segments 106 will be chosen for optimum wear characteristics. Since the braking torque will primarily be introduced into the slots 112 of the carrier disc 102, the strength of the disc 102 is of primary importance. Similarly, since the frictional interface for the braking operation is provided by the wear segments 106, it is important that the material of those segments be chosen for optimum wear characteristics.

Those skilled in the art will understand that the segments 106 could be provided to extend to the outer radius of the disc 100 and then machined to remove the slot 112 from the combination of the segments 106 and the carrier disc 102 in order to define the external rim 110. In such a case, the drive clip would be received by the external rim 110 which would comprise both the central core disc 102 and the wear segments 106. Additionally, in such an embodiment the drive clip would also serve to hold the laminate of the wear rings and carrier disc together.

It is also contemplated as a portion of the invention that the wear ring could be configured as a single annular disc, rather than comprising a plurality of abutting arcuate segments. However, the segmented pads 106 are more conducive to economy of manufacturing. In that regard, it will also be appreciated that the elements 102, 106 may be formed of either new or used carbon as taken from brake discs at overhaul.

It should now be readily appreciated that the concept of the instant invention provides for optimum utilization of carbon in brake disc assemblies by using "worn" or otherwise "spent" discs in the fabrication of "new" discs suitable for use in a brake assembly. Worn or spent discs may be used to make carbon screws or threaded carbon rods to secure the components together during fabrication. Additionally, such worn or spent discs may themselves be used in a sandwiching technique to provide an integral brake assembly, or a brake disc assembly in which a carrier plate receives either wear pads or wear discs fabricated from such previously used discs. It should further be understood that the use of carbon screws and threaded carbon rods in the various embodiments presented herein are substantially interchangeable, and not limited to the specific embodiments shown.

Thus it can be seen that the objects of the invention have been satisfied by the structures and techniques presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A brake disc, comprising:

a carrier plate;

carbon wear plates maintained on opposite sides of said carrier plate, said carbon wear plates having a wear surface area; and threaded carbon members passing through and flush with said wear surface areas and into said carrier plate and securing said carbon wear plates thereto to form the brake disc.

2. The brake disc according to claim 1, wherein said carrier plate comprises an annular carbon disc.

3. The brake disc according to claim 2, wherein said carbon wear plates comprise annular discs, said carbon wear plates having equal thicknesses which exceed a thickness of said carrier plate.

4. The brake disc according to claim 3, wherein said carrier plate and wear plates comprise worn discs having a predetermined thickness.

5. The brake disc according to claim 3, wherein said threaded carbon members comprise screws threaded at a first end thereof, and configured at a second opposite end to be received by a tool, and further having a conical section adjacent said second end for receipt in counter bores in said carbon wear plates, said threaded carbon members being made of substantially the same carbon material as said carbon wear plates.

6. The brake disc according to claim 5, wherein ends of said carbon screws are flush with outer surfaces of said carbon wear plates and wherein voids between said screws, carrier plates and carbon wear plates are infiltrated with carbon such that said brake disc comprises a substantially homogeneous structure.

7. The brake disc according to claim 1, wherein each said wear plate comprises an annular disc.

8. The brake disc according to claim 7, wherein said annular discs are secured to each other and said carrier plate by carbon screws, each said carbon screw having a tapered head seated within a counterbore.

9. A brake disc unit, comprising:

a carrier plate; and carbon wear plates having outwardly facing wear surface areas maintained on opposite sides of said carrier plate and secured thereto by elongated threaded carbon members through and flush with said wear surface areas.

* * * * *